United States Patent
Hodotsuka et al.

(10) Patent No.: US 9,157,353 B2
(45) Date of Patent: Oct. 13, 2015

(54) CARBON DIOXIDE CAPTURING SYSTEM AND METHOD OF OPERATING SAME

(71) Applicants: Kabushiki Kaisha Toshiba, Tokyo (JP); Toshiba Plant Systems & Services Corporation, Kanagawa-ken (JP)

(72) Inventors: Masatoshi Hodotsuka, Saitama (JP); Mitsuru Udatsu, Kanagawa (JP); Satoshi Saito, Kanagawa (JP); Satoru Kashimoto, Kanagawa (JP)

(73) Assignees: Kabushiki Kaisha Toshiba, Tokyo (JP); Toshiba Plant Systems & Services Corporation, Kanagawa (JP)

( * ) Notice: Subject to any disclaimer, the term of this patent is extended or adjusted under 35 U.S.C. 154(b) by 322 days.

(21) Appl. No.: 13/902,240

(22) Filed: May 24, 2013

(65) Prior Publication Data
US 2013/0336867 A1   Dec. 19, 2013

(30) Foreign Application Priority Data

May 30, 2012 (JP) .................................. 2012-123606
Apr. 17, 2013 (JP) .................................. 2013-086849

(51) Int. Cl.
*B01D 53/14* (2006.01)
*B01D 53/62* (2006.01)
(Continued)

(52) U.S. Cl.
CPC .......... *F01N 3/0807* (2013.01); *B01D 53/1425* (2013.01); *B01D 53/1475* (2013.01);
(Continued)

(58) Field of Classification Search
CPC .... B01D 53/14; B01D 53/1425; B01D 53/62; B01D 53/78; B01D 53/1475
See application file for complete search history.

(56) References Cited

U.S. PATENT DOCUMENTS 8,506,693 B2 *   8/2013   Nagayasu et al. .............. 96/243
2010/0101415 A1   4/2010   Find et al.
(Continued)

FOREIGN PATENT DOCUMENTS

AU     2012202267 B2 *   2/2014   ............. B01D 53/14
CN     102781551 A   *   11/2012  ............. B01D 53/14
(Continued)

OTHER PUBLICATIONS

Australian Office Action dated Jan. 20, 2015, filed in Australian counterpart Application No. 2013205972, 3 pages.
(Continued)

*Primary Examiner* — Timothy Vanoy
(74) *Attorney, Agent, or Firm* — Patterson & Sheridan, LLP

(57) ABSTRACT

In one embodiment, a carbon dioxide capturing system includes an absorption tower to bring a gas containing carbon dioxide into contact with an absorbing liquid to discharge the absorbing liquid which has absorbed the carbon dioxide and discharge the gas whose carbon dioxide concentration is reduced. The system includes a regeneration tower to release the carbon dioxide from the absorbing liquid to discharge the absorbing liquid whose carbon dioxide concentration is reduced and discharge a gas containing the carbon dioxide. The system includes a first absorbing liquid component washing apparatus to cool the gas which is discharged from the absorption or regeneration tower and has passed through an absorption or regeneration tower condenser to condense or sublime an absorbing liquid component in the gas and remove a liquid or solid product generated by the condensation or sublimation of the absorbing liquid component by using a washing liquid.

12 Claims, 8 Drawing Sheets

(51) Int. Cl.
  *B01D 53/78* (2006.01)
  *F01N 3/08* (2006.01)
  *B01D 53/18* (2006.01)

(52) U.S. Cl.
  CPC ............... *B01D53/18* (2013.01); *B01D 53/62* (2013.01); *B01D 2252/204* (2013.01); *B01D 2258/025* (2013.01); *B01D 2258/0283* (2013.01); *Y02C 10/04* (2013.01); *Y02C 10/06* (2013.01)

(56) References Cited

U.S. PATENT DOCUMENTS

| | | |
|---|---|---|
| 2010/0294131 A1 | 11/2010 | Bade et al. |
| 2011/0135550 A1 | 6/2011 | Nagayasu et al. |
| 2012/0060689 A1 | 3/2012 | Naumovitz et al. |
| 2012/0263627 A1 | 10/2012 | Fujita et al. |
| 2013/0259780 A1 * | 10/2013 | Handagama et al. ......... 423/220 |

FOREIGN PATENT DOCUMENTS

| | | | |
|---|---|---|---|
| EP | 2229996 A1 | 9/2010 | |
| EP | 2335802 A2 | 6/2011 | |
| EP | 2548640 A4 * | 3/2014 | ............... B01J 23/28 |
| FR | 2958180 A1 | 10/2011 | |
| JP | 2011-115724 | 6/2011 | |
| JP | 2012-223681 | 11/2012 | |
| WO | 2013081126 A1 | 6/2013 | |
| WO | WO 2014041986 A1 * | 3/2014 | ............. B01D 53/50 |

OTHER PUBLICATIONS

Partial European Search Report dated Aug. 27, 2013, issued in European counterpart Application No. 13169225.3, 7 pages.

Chinese Office Action dated Oct. 28, 2014, filed in Chinese counterpart Application No. 201310208270.7, 11 pages (with translation).

* cited by examiner

CARBON DIOXIDE CAPTURING SYSTEM AND METHOD OF OPERATING SAME

CROSS REFERENCE TO RELATED APPLICATIONS

This application is based upon and claims the benefit of priority from the prior Japanese Patent Applications No. 2012-123606, filed on May 30, 2012 and No. 2013-86849, filed on Apr. 17, 2013, the entire contents of which are incorporated herein by reference.

FIELD

Embodiments described herein relate to a carbon dioxide capturing system and a method of operating the same.

BACKGROUND

In recent years, a carbon dioxide ($CO_2$) capture and storage technique has been attracting attention as an effective measure against the global warming problem. For example, a method of capturing carbon dioxide in an exhaust gas using an absorbing liquid has been examined for a combustion exhaust gas emitted from thermal power plants, a process exhaust gas emitted from ironworks, and the like. Examples of the absorbing liquid include an amine water solution.

Specifically, there is known a carbon dioxide capturing system which includes an absorption tower configured to bring an exhaust gas into contact with an absorbing liquid to cause the absorbing liquid to absorb carbon dioxide in the exhaust gas, and a regeneration tower configured to heat the absorbing liquid which has absorbed the carbon dioxide to release the carbon dioxide from the absorbing liquid. The absorbing liquid regenerated in the regeneration tower is supplied to the absorption tower and is reused. This system separates and captures the carbon dioxide in the exhaust gas by repeating the absorption of the carbon dioxide in the absorption tower and the release of the carbon dioxide in the regeneration tower.

DETAILED DESCRIPTION

Embodiments will now be explained with reference to the accompanying drawings.

The gas discharged from the absorption tower and the regeneration tower usually contains a gaseous or liquid (mist-like) absorbing liquid component. Depending on a type of the absorbing liquid, the absorbing liquid component may precipitate in a pipe downstream of an absorption tower condenser or a regeneration tower condenser. In this case, a differential pressure in the pipe rises to disable continuation of the operation of the system and to cause wrong measurement by a measuring instrument.

In one embodiment, a carbon dioxide capturing system includes an absorption tower configured to bring a gas containing carbon dioxide into contact with an absorbing liquid to discharge the absorbing liquid which has absorbed the carbon dioxide and to discharge the gas whose carbon dioxide concentration is reduced, and an absorption tower condenser configured to condense water vapor in the gas discharged from the absorption tower. The system further includes a regeneration tower configured to release the carbon dioxide from the absorbing liquid discharged from the absorption tower to discharge the absorbing liquid whose carbon dioxide concentration is reduced and to discharge a gas containing the carbon dioxide, and a regeneration tower condenser configured to condense water vapor in the gas discharged from the regeneration tower. The system further includes a first absorbing liquid component washing apparatus configured to cool the gas which has passed through the absorption tower condenser or the regeneration tower condenser to condense or sublime an absorbing liquid component in the gas and remove a liquid or solid product generated by the condensation or the sublimation of the absorbing liquid component by using a washing liquid.

(First Embodiment)

Figure 1:
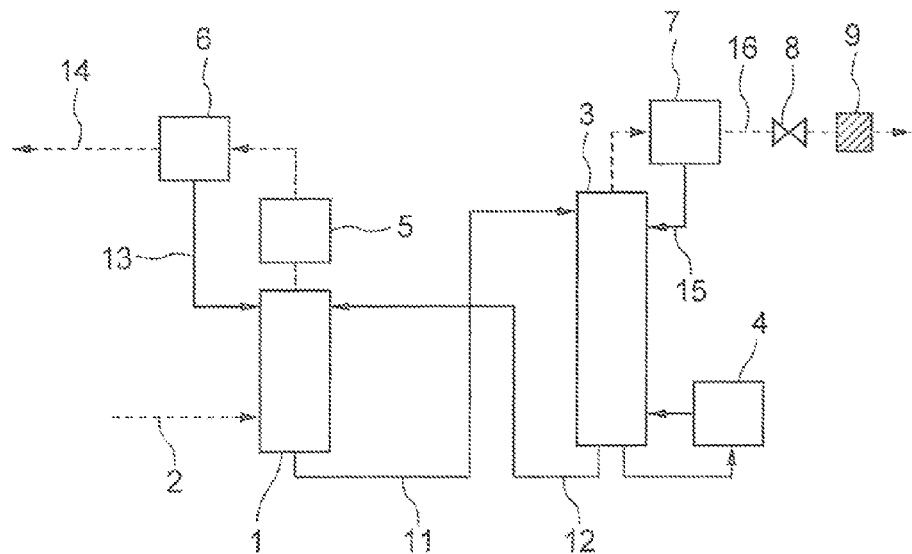
FIG. 1 is a schematic diagram showing a structure of a carbon dioxide capturing system of a first embodiment.

FIG. 1 is a schematic diagram showing a structure of a carbon dioxide capturing system of a first embodiment.

The carbon dioxide capturing system of FIG. 1 includes an absorption tower 1, a gas supply port 2, a regeneration tower 3, a reboiler 4, an amine washer 5, an absorption tower condenser 6, a regeneration tower condenser 7, a pressure reducing valve 8, and an additional amine washing apparatus 9.

The absorption tower 1 includes the gas supply port 2 for introducing a treatment target gas containing carbon dioxide.

Examples of the treatment target gas include a combustion exhaust gas emitted from thermal power plants and a process exhaust gas emitted from ironworks.

The absorption tower 1 brings the treatment target gas introduced from the gas supply port 2 into contact with an absorbing liquid. As a result, the absorbing liquid which has absorbed the carbon dioxide, and the treatment target gas whose carbon dioxide concentration becomes lower than that of the treatment target gas introduced from the gas supply port 2 are discharged from the absorption tower 1. This gas is hereinafter referred to as "treated gas". Examples of the absorbing liquid include, besides an amine water solution, an amino acid containing water solution, an alkali water solution, an ionic liquid, and a water solution of the ionic liquid. The absorption tower 1 is, for example, a packed tower or a plate tower of a cross flow gas-liquid contact type.

The treated gas discharged from the absorption tower 1 sequentially passes the amine washer 5 disposed above the absorption tower 1 and the absorption tower condenser 6 disposed downstream of the amine washer 5. The amine washer 5 removes an absorbing liquid component accompanying the treated gas. The absorption tower condenser 6 mainly condenses water vapor in the treated gas. Condensed water generated by the absorption tower condenser 6 is returned to the absorption tower 1 and the like through an absorption tower condensed water line 13. On the other hand, the gas not condensed by the absorption tower condenser 6 is discharged to the outside of the system through an absorption tower condenser discharge gas line 14.

The absorbing liquid (rich liquid) discharged from the absorption tower 1 is introduced into the regeneration tower 3 from an upper part of the regeneration tower 3 through a rich liquid line 11. The absorbing liquid flows down in the regeneration tower 3. Water vapor and carbon dioxide generated by heating the absorbing liquid in the reboiler 4 are supplied to the regeneration tower 3. These gases come into gas-liquid contact with the absorbing liquid while rising in the regeneration tower 3. As a result, the carbon dioxide is released from the absorbing liquid. The absorbing liquid whose carbon dioxide concentration becomes lower than that of the absorbing liquid introduced into the regeneration tower 3, and a gas containing the released carbon dioxide are discharged from the regeneration tower 3.

The gas discharged from the regeneration tower 3 passes through the regeneration tower condenser 7 disposed above the regeneration tower 3. The regeneration tower condenser 7 condenses water vapor in this gas. Condensed water generated by the regeneration tower condenser 7 is returned to the regeneration tower 3 and the like through a regeneration tower condensed water line 15. On the other hand, the gas not condensed by the regeneration tower condenser 7 is discharged to the outside of the system after passing through the pressure reducing valve 8 and the additional amine washing apparatus 9 on a regeneration tower condenser discharge gas line 16. Details of the pressure reducing valve 8 and the additional amine washing apparatus 9 are explained below.

Both of the amine washer 5 and the additional amine washing apparatus 9 are modules to wash and remove an amine component in a washing target gas. However, the additional amine washing apparatus 9 can further reduce an amine vapor pressure and an amine concentration by cooling the gas at temperature lower than temperature of cooling by the amine washer 5. The amine washer 5 and the additional amine washing apparatus 9 are examples of a second absorbing liquid component washing apparatus and a first absorbing liquid component washing apparatus, respectively.

The absorbing liquid (lean liquid) discharged from the regeneration tower 3 is introduced into the absorption tower 1 through a lean liquid line 12 and is reused. In this way, the carbon dioxide capturing system of FIG. 1 separates and captures the carbon oxide in the treatment target gas by repeating the absorption of the carbon dioxide in the absorption tower 1 and the release of the carbon dioxide in the regeneration tower 3.

1) Details of Additional Amine Washing Apparatus 9 (1)

Details of the additional amine washing apparatus 9 are explained with reference to FIG. 2.

Figure 2:
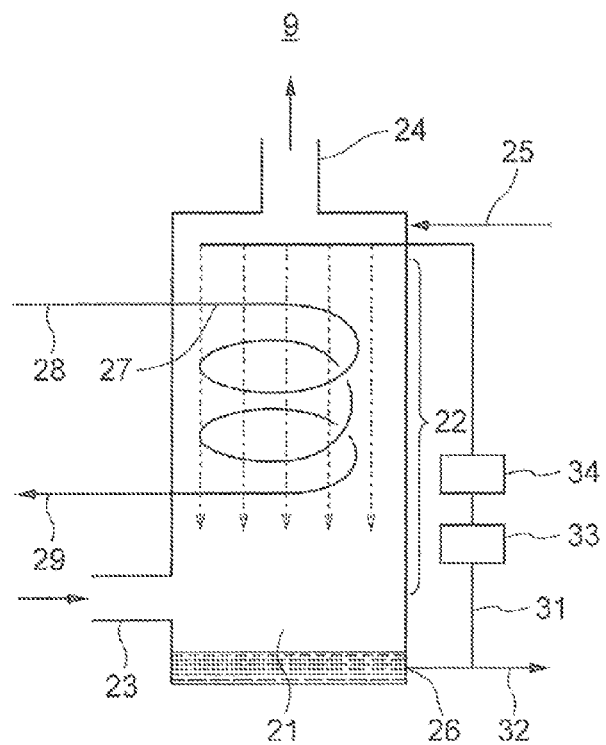
FIG. 2 is a schematic diagram showing a structure of an additional amine washing apparatus of the first embodiment.

FIG. 2 is a schematic diagram showing a structure of the additional amine washing apparatus 9 of the first embodiment.

The additional amine washing apparatus 9 includes a gas-liquid contact tower 21 which includes a gas-liquid contact portion 22, a gas supply port 23, a gas discharge port 24, a washing liquid supply port 25, and a washing liquid discharge port 26, a cooling pipe 27 which includes a cooling pipe inlet 28 and a cooling pipe outlet 29, and a circulation line 31 which includes a washing liquid discharge port 32, a temperature controller 33, and a washing liquid measuring instrument 34.

The gas which has passed through the regeneration tower condenser 7 is introduced into the gas-liquid contact tower 21 from the gas supply port 23 and discharged from the gas discharge port 24. On the other hand, a washing liquid is introduced into the gas-liquid contact tower 21 from the washing liquid supply port 25 and drops from an upper part to a lower part of the gas-liquid contact tower 21. After being held at the bottom of the gas-liquid contact tower 21, a part of the washing liquid is discharged from the washing liquid discharge port 26. The washing liquid discharged from the gas-liquid contact tower 21 is returned to the upper part of the gas-liquid contact tower 21 through the circulation line 31, is introduced into the gas-liquid contact tower 21, and is reused. Alternatively, the washing liquid is discharged from the washing liquid discharge port 32 of the circulation line 31. Cooling water is supplied from the cooling pipe inlet 28 to the cooling pipe 27 in the gas-liquid contact tower 21. After cooling the gas in the gas-liquid contact tower 21, the cooling water is discharged from the cooling pipe outlet 29.

The gas-liquid contact tower 21 brings the gas from the regeneration tower condenser 7 into contact with the washing liquid in the gas-liquid contact portion 22. At this time, the absorbing liquid component in the gas is cooled to be condensed or sublimed in the vicinity of a cooling heat-transfer surface of the cooling pipe 27. As a result, a liquid or solid product is generated from the absorbing liquid component. Examples of the product include a product containing amine and carbon dioxide, a product containing amino acid and carbon dioxide, and a product containing alkali carbonate.

Thereafter, the liquid product drops to the bottom of the gas-liquid contact tower 21 together with the washing liquid. The solid product adheres to the cooling heat-transfer surface of the cooling pipe 27, and is then dissolved in the dropping washing liquid to drop to the bottom of the gas-liquid contact tower 21 together with the washing liquid. In this way, in this embodiment, the absorbing liquid component in the gas is changed to the liquid or solid product and removed. The gas-liquid contact tower 21 is an example of a gas path including the cooling heat-transfer surface.

The product adhering to the cooling heat-transfer surface is sometimes peeled off from the cooling heat-transfer surface by the power of the washing liquid. Thereafter, the peeled-off product dissolves in the washing liquid or deposits in the bottom of the gas-liquid contact tower 21. This deposit may be removed by filtering.

In order to wash away the product adhering to the cooling heat-transfer surface or efficiently bring the gas and the washing liquid into gas-liquid contact with each other in the gas-liquid contact portion 22, the washing liquid returned by the circulation line 31 is desirably sprayed in a shower-like manner from the upper part of the gas-liquid contact tower 21. Alternatively, the efficient gas-liquid contact may be realized by, for example, loading a filler in the gas-liquid contact portion 22.

Examples of the washing liquid include reboiler condensed water, feed gas condensed water, absorption tower condensed water, regeneration tower condensed liquid, makeup water, water dedicated for washing, drainage after diffused amine capturing, and unused, in-use, and used absorbing liquids. When the absorbing liquid is used as the washing liquid, at least a part of the absorbing liquid component accompanying the gas is dissolved in the washing liquid to be removed in the gas-liquid contact of the gas and the washing liquid in the gas-liquid contact portion 22. This applies as well when a liquid other than the absorbing liquid that can absorb the absorbing liquid component is used.

2) Details of Additional Amine Washing Apparatus 9 (2)

Further details of the additional amine washing apparatus 9 are explained with reference to FIG. 2.

The temperature controller 33 is configured to control the temperature of the washing liquid in the circulation line 31. For example, the temperature controller 33 controls the temperature of the washing liquid to set the temperature of the washing liquid to be lower than the outdoor air temperature in the gas-liquid contact. This is because, if the temperature of the washing liquid is higher than the outdoor air temperature in the gas-liquid contact, the absorbing liquid component remaining in the gas discharged from the gas discharge port 24 may be then condensed or sublimed due to a temperature drop and may clog a pipe downstream of the gas discharge port 24. Conversely, in order to allow the product adhering to the cooling heat-transfer surface to be easily dissolved, the temperature controller 33 may set the temperature of the washing liquid at a high temperature.

The temperature controller 33 may control the temperature of the washing liquid held up in the bottom of the gas-liquid contact tower 21 instead of controlling the temperature of the washing liquid in the circulation line 31.

The washing liquid measuring instrument 34 is configured to measure the concentration of the product dissolved in the washing liquid in the circulation line 31. In this embodiment, the concentration of the product in the washing liquid is monitored by the washing liquid measuring instrument 34 and is used for washing liquid management. For example, when the concentration of the product reaches a setting value, the washing liquid is discharged from the washing liquid discharge port 32 of the circulation line 31.

The washing liquid measuring instrument 34 may measure a quantity that fluctuates according to the concentration of the product instead of measuring the concentration of the product. Similarly to the concentration, this quantity can also be used for the washing liquid management. Examples of such a quantity include pH, density, and electrical conductivity of the washing liquid.

The washing liquid measuring instrument 34 may measure the concentration and the quality of the washing liquid held up in the bottom of the gas-liquid contact tower 21 instead of measuring the washing liquid in the circulation line 31.

The washing liquid discharged from the washing liquid discharge port 32 contains a large amount of the absorbing liquid component such as amine. Therefore, the washing liquid may be reused as the absorbing liquid. However, the concentration of the absorbing liquid component in the washing liquid is generally lower than the concentration of the absorbing liquid component in the original absorbing liquid. Therefore, the washing liquid is desirably mixed with the original absorbing liquid and reused.

Details of the regeneration tower condenser 7, the pressure reducing valve 8, and the additional amine washing apparatus 9 of FIG. 1 are explained.

When the additional amine washing apparatus 9 is disposed downstream of the regeneration tower condenser 7 as shown in FIG. 1, the regeneration tower condenser 7 may be a partial condenser configured to condense only a part of water vapor in the gas rather than a full condenser configured to condense all the water vapor in the gas. This is because the gas discharged from the regeneration tower condenser 7 is exposed to the washing liquid again in the additional amine washing apparatus 9 and the water vapor in the gas changes to water.

The pressure reducing valve 8 is provided on a pipe (the regeneration tower condenser discharge gas line 16) disposed between the regeneration tower condenser 7 and the additional amine washing apparatus 9. In general, the pressure of the gas discharged from the regeneration tower 3 is higher than the atmospheric pressure. Therefore, the pressure reducing valve 8 is used to reduce the pressure of this gas.

When the pressure of the gas is reduced by the pressure reducing valve 8, the temperature of the gas is reduced due to adiabatic expansion. In this embodiment, in order to condense or sublime the absorbing liquid component in the gas, not only cooling effect by the cooling pipe 27 but also cooling effect by the adiabatic expansion in the pressure reducing valve 8 may be used. However, in this case, in order to suppress condensation or sublimation from occurring before the gas reaches the additional amine washing apparatus 9, it is desirable to set the length of the pipe disposed between the pressure reducing valve 8 and the additional amine washing apparatus 9 as small as possible.

3) Modifications of First Embodiment

Figure 3:
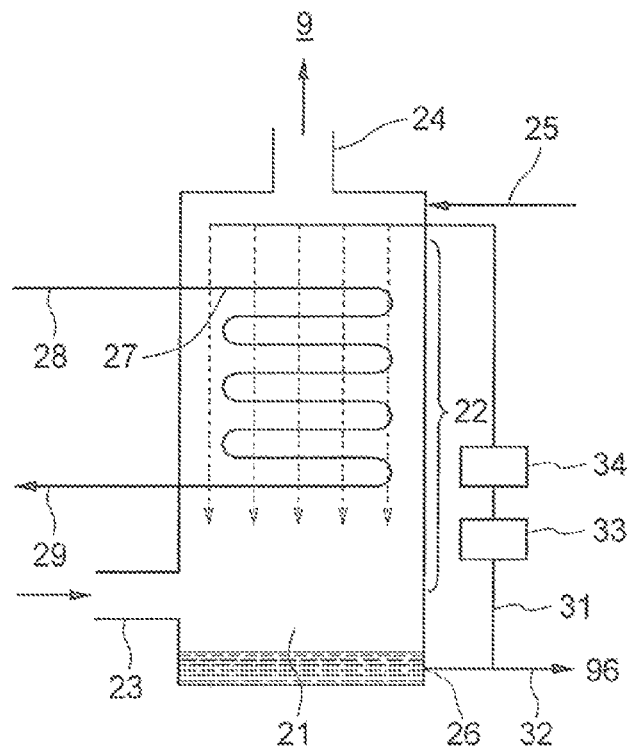
FIG. 3 is a schematic diagram showing a structure of an additional amine washing apparatus of a first modification of the first embodiment.
Figure 4:
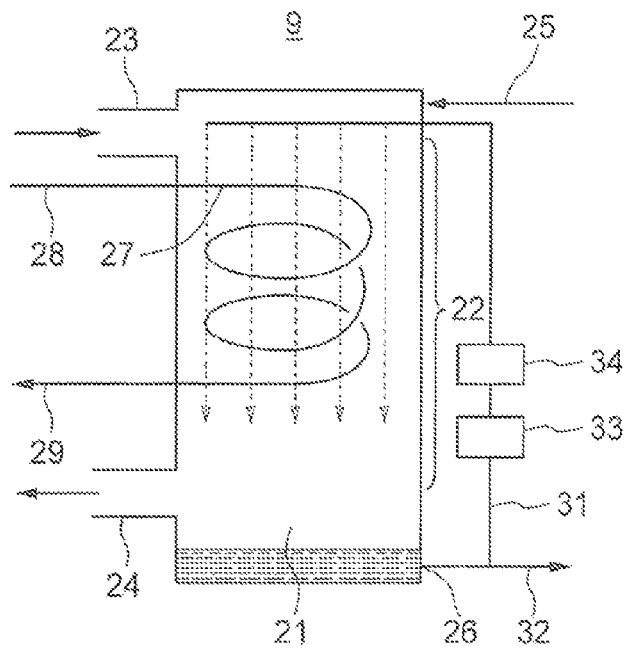
FIG. 4 is a schematic diagram showing a structure of an additional amine washing apparatus of a second modification of the first embodiment.

Modifications of the first embodiment are explained with reference to FIGS. 3 and 4. FIGS. 3 and 4 are schematic diagrams showing structures of an additional amine washing apparatus 9 of first and second modifications of the first embodiment, respectively.

In FIG. 2, the cooling pipe 27 has a spiral shape. Such a shape has an advantage that a contact area of the cooling pipe 27 and gas increases. The shape of the cooling pipe 27 may be a shape other than the spiral shape but is desirably a shape that increases the contact area with the gas. An example of such a cooling pipe 27 is shown in FIG. 3. The cooling pipe 27 of FIG. 3 has a shape including a plurality of bent portions.

In FIG. 2, the gas supply port 23 is set in the lower part of the gas-liquid contact tower 21 and the gas discharge port 24 is set in the upper part of the gas-liquid contact tower 21. Therefore, a flow of the gas in the gas-liquid contact tower 21 is an ascending current. On the other hand, as shown in FIG. 4, the gas supply port 23 may be set in the upper part of the gas-liquid contact tower 21 and the gas discharge port 24 may be set in the lower part of the gas-liquid contact tower 21. In this case, a flow of the gas in the gas-liquid contact tower 21 is a descending current. It is desirable to determine which of the structures shown in FIGS. 2 and 4 is adopted according to types of the gas, the washing liquid, and the absorbing liquid component and the structure of the gas-liquid contact tower 21, for example.

4) Effect of First Embodiment

An effect of the first embodiment is explained. As described above, the gas which has passed through the regeneration tower condenser 7 is cooled to condense or sublime the absorbing liquid component, and the liquid or solid product generated as a result thereof is removed by the washing liquid in this embodiment. Therefore, according to this embodiment, it is possible to prevent the clogging of the pipe due to the precipitation of the absorbing liquid component in the gas discharged from the regeneration tower 3.

(Second Embodiment)

Figure 5:
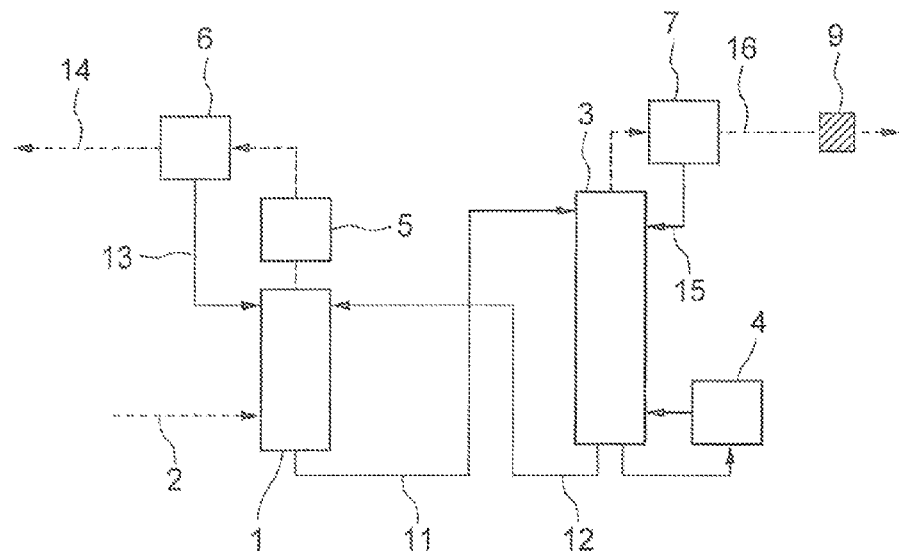
FIG. 5 is a schematic diagram showing a structure of a carbon dioxide capturing system of a second embodiment.

FIG. 5 is a schematic diagram showing a structure of a carbon dioxide capturing system of a second embodiment.

A difference between the carbon dioxide capturing systems of FIGS. 1 and 5 is presence or absence of the pressure reducing valve 8. In the system of FIG. 1, when the pressure of the gas is reduced by the pressure reducing valve 8, the temperature of the gas is reduced due to adiabatic expansion. Therefore, if the additional amine washing apparatus 9 is not disposed, it is likely that the absorbing liquid component in the gas precipitates in some place of the pipe downstream of the pressure reducing valve 8 and the pipe is clogged. Therefore, in the system of FIG. 1, the additional amine washing apparatus 9 is disposed downstream of the pressure reducing valve 8 to prevent the clogging of the pipe.

On the other hand, the system of FIG. 5 does not include the pressure reducing valve 8. Therefore, there is no problem of the clogging of the pipe due to the gas pressure drop in the pressure reducing valve 8. However, in the system of FIG. 5, when there is a place where the pipe downstream of the regeneration tower condenser 7 is partially cooled due to some reason, precipitation of the absorbing liquid occurs in the vicinity of the place, for example. In such a case, in the system of FIG. 5, as in the system of FIG. 1, it is possible to prevent the clogging of the pipe by setting the additional amine washing apparatus 9 downstream of the regeneration tower condenser 7.

In this embodiment, as in the first embodiment, the gas which has passed through the regeneration tower condenser 7 is cooled to condense or sublime the absorbing liquid component, and the liquid or solid product generated as a result thereof is removed by the washing liquid. Therefore, according to this embodiment, as in the first embodiment, it is possible to prevent the clogging of the pipe due to the precipitation of the absorbing liquid component in the gas discharged from the regeneration tower 3.

(Third Embodiment)

Figure 6:
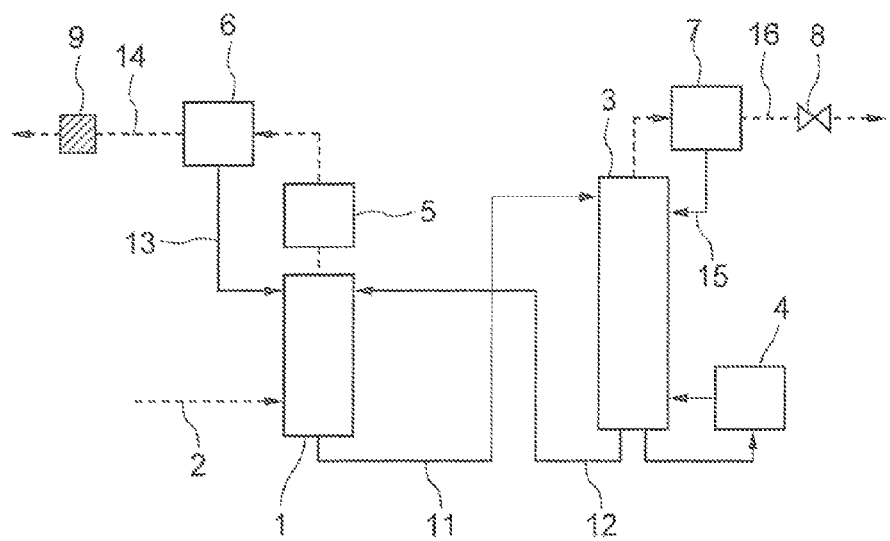
FIG. 6 is a schematic diagram showing a structure of a carbon dioxide capturing system of a third embodiment.

FIG. 6 is a schematic diagram showing a structure of a carbon dioxide capturing system of a third embodiment.

In the system of FIG. 6, the additional amine washing apparatus 9 is disposed downstream of the absorption tower condenser 6 rather than downstream of the regeneration tower condenser 7. Although the concentration of the absorbing liquid component in the gas discharged from the absorption tower condenser 6 is generally lower than the concentration of the absorbing liquid component in the gas discharged from the regeneration tower condenser 7, precipitation of the absorbing liquid component could occur. Therefore, in the system of FIG. 6, the additional amine washing apparatus 9 is disposed downstream of the absorption tower condenser 6 to prevent the clogging of the pipe downstream of the absorption tower condenser 6.

In the system of FIG. 6, a pressure reducing valve may be provided on the pipe disposed between the absorption tower condenser 6 and the additional amine washing apparatus 9. In the system of FIG. 6, the absorption tower condenser 6 may be a partial condenser.

In this embodiment, the gas which has passed through the absorption tower condenser 6 is cooled to condense or sublime the absorbing liquid component, and the liquid or solid product generated as a result thereof is removed by the washing liquid. Therefore, according to this embodiment, it is possible to prevent the clogging of the pipe due to the precipitation of the absorbing liquid component in the gas discharged from the absorption tower 1.

(Modifications of First and Third Embodiments)

Modifications of the first and third embodiments are explained with reference to FIGS. 7 to 16.

FIGS. 7 to 10 are schematic diagrams showing structures of a part of a carbon dioxide capturing system of third to sixth modifications of the first embodiment, respectively.

Figure 7:
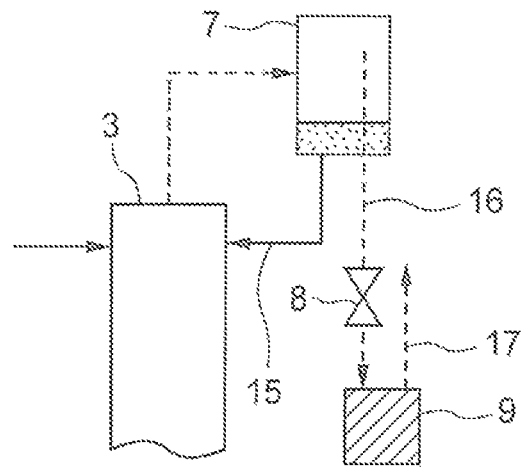
FIG. 7 is a schematic diagram showing a structure of a part of a carbon dioxide capturing system of a third modification of the first embodiment.

The additional amine washing apparatus 9 of FIG. 7 cools gas at temperature lower than temperature of cooling by the regeneration tower condenser 7 to reduce amine vapor pressure and amine concentration. In FIG. 7, the regeneration tower condenser discharge gas line 16 disposed between the regeneration tower condenser 7 and the additional amine washing apparatus 9 is configured not to include a horizontal portion. Specifically, the regeneration tower condenser discharge gas line 16 is a descending pipe. A solid content tends to be generated between the pressure reducing valve 8 and the additional amine washing apparatus 9 because of a temperature drop due to adiabatic expansion. However, since the regeneration tower condenser discharge gas line 16 of FIG. 7 is the descending pipe, it is possible to suppress the solid content from being held up in the pipe. In FIG. 7, a washing apparatus discharge gas line 17 through which the discharged gas from the additional amine washing apparatus 9 flows is an ascending pipe. Therefore, the solid content is less easily discharged from the additional amine washing apparatus 9 because of the action of the gravity.

Figure 8:
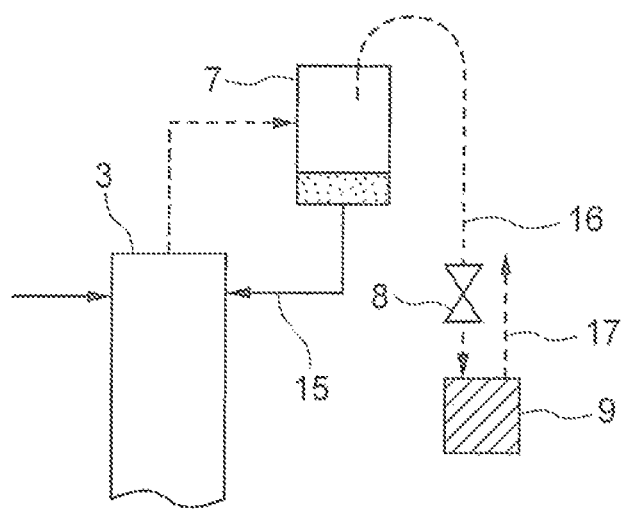
FIG. 8 is a schematic diagram showing a structure of a part of a carbon dioxide capturing system of a fourth modification of the first embodiment.

In FIG. 8, the regeneration tower condenser discharge gas line 16 disposed between the regeneration tower condenser 7 and the pressure reducing valve 8 is a reverse U-shape pipe. A portion of the regeneration tower condenser discharge gas line 16 between the pressure reducing valve 8 and the additional amine washing apparatus 9 is a descending pipe. Such a structure has an advantage that a solid content generated in the regeneration tower condenser 7 is less easily discharged from the regeneration tower condenser 7 because of the action of the gravity.

Figure 9:
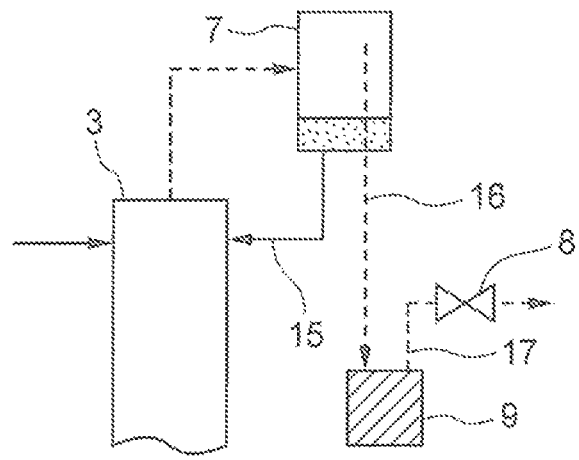
FIG. 9 is a schematic diagram showing a structure of a part of a carbon dioxide capturing system of a fifth modification of the first embodiment.
Figure 10:
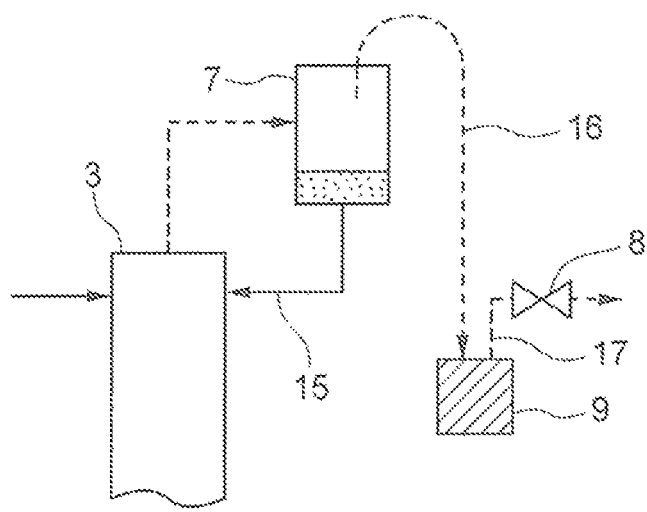
FIG. 10 is a schematic diagram showing a structure of a part of a carbon dioxide capturing system of a sixth modification of the first embodiment.

In FIGS. 7 and 8, the pressure reducing valve 8 may be disposed on the washing apparatus discharge gas line 17 rather than on the regeneration tower condenser discharge gas line 16 (see FIGS. 9 and 10).

FIGS. 11 to 14 are schematic diagrams showing structures of a part of a carbon dioxide capturing system of first to fourth modifications of the third embodiment, respectively.

Figure 11:
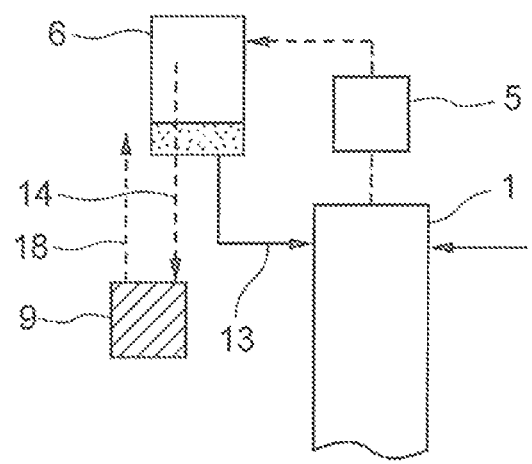
FIG. 11 is a schematic diagram showing a structure of a part of a carbon dioxide capturing system of a first modification of the third embodiment.

The additional amine washing apparatus 9 of FIG. 11 cools the gas at temperature lower than temperature of cooling by the absorption tower condenser 6 to reduce amine vapor pressure and amine concentration. In FIG. 11, the absorption tower condenser discharge gas line 14 disposed between the absorption tower condenser 6 and the additional amine washing apparatus 9 is configured not to include a horizontal portion. Specifically, the absorption tower condenser discharge gas line 14 is a descending pipe. A solid content is sometimes generated between the absorption tower condenser 6 and the additional amine washing apparatus 9 because the pipe is cooled by heat radiation to the outdoor air or the like. However, since the absorption tower condenser discharge gas line 14 of FIG. 11 is the descending pipe, it is possible to suppress the solid content from being held up in the pipe. In FIG. 11, a washing apparatus discharge gas line 18 through which the discharged gas from the additional amine washing apparatus 9 flows is an ascending pipe. Therefore, the solid content is less easily discharged from the additional amine washing apparatus 9 because of the action of the gravity.

Figure 12:
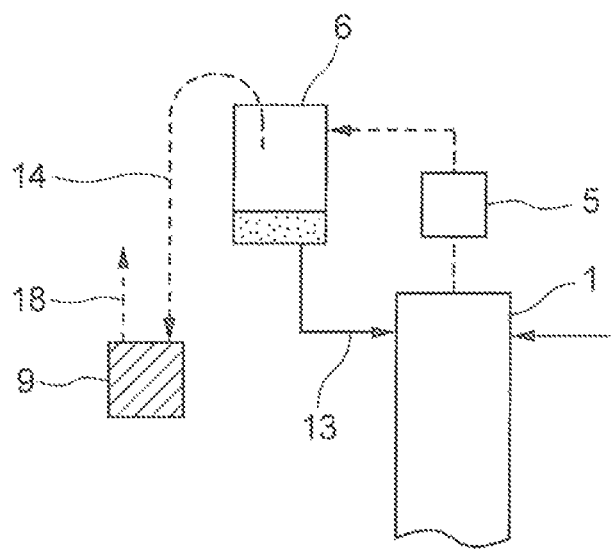
FIG. 12 is a schematic diagram showing a structure of a part of a carbon dioxide capturing system of a second modification of the third embodiment.

In FIG. 12, a portion of the absorption tower condenser discharge gas line 14 between the absorption tower condenser 6 and the additional amine washing apparatus 9 is a reverse U-shape pipe. Such a structure has an advantage that a solid content generated in the absorption tower condenser 6 is less easily discharged from the absorption tower condenser 6 because of the action of the gravity.

Figure 13:
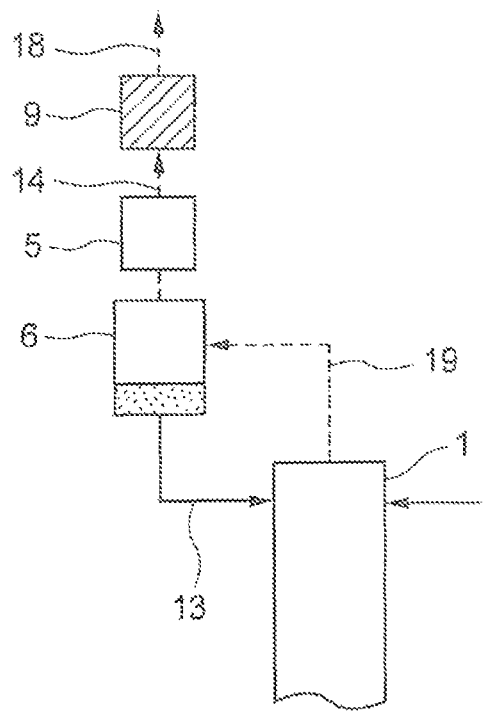
FIG. 13 is a schematic diagram showing a structure of a part of a carbon dioxide capturing system of a third modification of the third embodiment.

In FIG. 13, the absorption tower condenser discharge gas line 14 is an ascending pipe. The amine washer 5 is disposed on the absorption tower condenser discharge gas line 14 between the absorption tower condenser 6 and the additional amine washing apparatus 9. In other words, the amine washer 5 and the additional amine washing apparatus 9 of FIG. 13 are disposed in series. The additional amine washing apparatus 9 of FIG. 13 cools the gas at temperature lower than temperature of cooling by the amine washer 5 to reduce amine vapor pressure and amine concentration.

Figure 14:
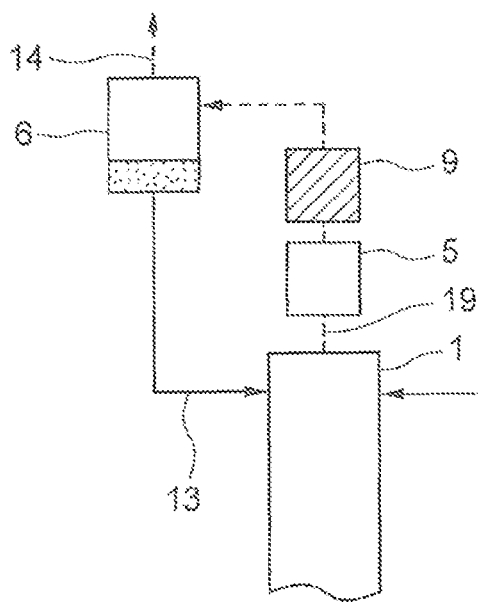
FIG. 14 is a schematic diagram showing a structure of a part of a carbon dioxide capturing system of a fourth modification of the third embodiment.

In FIG. 14, the amine washer 5 and the additional amine washing apparatus 9 are disposed in series on a treated gas line 19 for supplying the treated gas discharged from the absorption tower 1 to the absorption tower condenser 6. The additional amine washing apparatus 9 of FIG. 13 is disposed downstream of the amine washer 5. The additional amine washing apparatus 9 cools the gas at temperature lower than temperature of cooling by the amine washer 5 to reduce amine vapor pressure and amine concentration.

Figure 15:
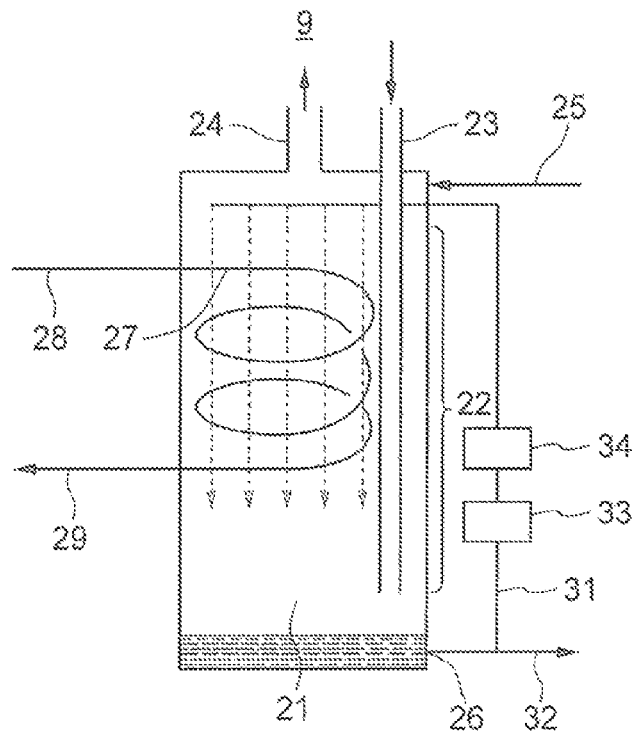
FIG. 15 is a schematic diagram showing a structure of an additional amine washing apparatus of a seventh modification of the first embodiment.
Figure 16:
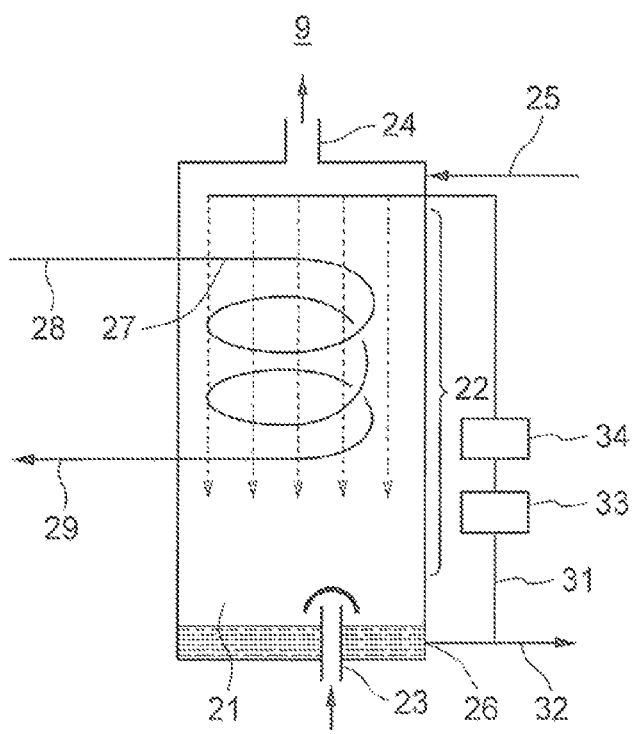
FIG. 16 is a schematic diagram showing a structure of an additional amine washing apparatus of an eighth modification of the first embodiment.

FIGS. 15 and 16 are schematic diagrams showing structures of an additional amine washing apparatus 9 of seventh and eighth modifications of the first embodiment, respectively.

In FIG. 15, a pipe for the gas supply port 23 is a descending pipe. The distal end of the pipe is located in the vicinity of the bottom of the gas-liquid contact tower 21. With such a structure, it is possible to suppress a solid content from being deposited in the pipe for the gas supply port 23. Since the distal end of the pipe is located in the vicinity of the bottom, it is possible to efficiently perform gas-liquid contact in the gas-liquid contact tower 21. In FIG. 16, a pipe for the gas supply port 23 is an ascending pipe. The distal end of the pipe is located in the vicinity of the bottom of the gas-liquid contact tower 21. With such a structure, it is possible to suppress a solid content from being deposited in the pipe for the gas supply port 23. Since the distal end of the pipe is located in the vicinity of the bottom, it is possible to efficiently perform gas-liquid contact in the gas-liquid contact tower 21. In FIG. 16, a concave member for allowing the gas to easily diffuse to the inside of the gas-liquid contact tower 21 is disposed in the vicinity of the distal end of the pipe for the gas supply port 23.

As described above, according to the modifications shown in FIGS. 7 to 16, since the pipes for the gas before the washing and the pipes for the gas after the washing are configured not to include horizontal portions, it is possible to suppress the solid content from being held up or being deposited, for example.

According to at least one of the embodiments described above, it is possible to prevent the clogging of the pipe due to the precipitation of the absorbing liquid component.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

The invention claimed is:

1. A carbon dioxide capturing system comprising:
   an absorption tower configured to bring a gas containing carbon dioxide into contact with an absorbing liquid to discharge the absorbing liquid which has absorbed the carbon dioxide and to discharge the gas whose carbon dioxide concentration is reduced;
   an absorption tower condenser configured to condense water vapor in the gas discharged from the absorption tower;
   a regeneration tower configured to release the carbon dioxide from the absorbing liquid discharged from the absorption tower to discharge the absorbing liquid whose carbon dioxide concentration is reduced and to discharge a gas containing the carbon dioxide;
   a regeneration tower condenser configured to condense water vapor in the gas discharged from the regeneration tower; and
   a first absorbing liquid component washing apparatus configured to cool the gas which has passed through the absorption tower condenser or the regeneration tower condenser to condense or sublime an absorbing liquid component in the gas and remove a liquid or solid product generated by the condensation or the sublimation of the absorbing liquid component by using a washing liquid.

2. The system of claim 1, wherein the first absorbing liquid component washing apparatus comprises a cooling heat-transfer surface for cooling the gas, the cooling heat-transfer surface being disposed on a path of the gas.

3. The system of claim 2, wherein the first absorbing liquid component washing apparatus dissolves at least a part of the product adhering to the cooling heat-transfer surface, in the washing liquid to remove the product.

4. The system of claim 1, wherein the first absorbing liquid component washing apparatus brings the gas into contact with the washing liquid and dissolves at least a part of the absorbing liquid component accompanying the gas, in the washing liquid to remove the product.

5. The system of claim 1, further comprising a pressure reducing valve provided on a pipe which is disposed between the absorption tower condenser or the regeneration tower condenser and the first absorbing liquid component washing apparatus.

6. The system of claim 1, wherein the first absorbing liquid component washing apparatus washes the gas which has passed through the absorption tower condenser or the regeneration tower condenser which is a partial condenser.

7. The system of claim 1, wherein the first absorbing liquid component washing apparatus comprises:
   a gas-liquid contact tower configured to bring the gas into contact with the washing liquid;
   a cooling pipe for cooling the gas in the gas-liquid contact tower; and a circulation line for resupplying the washing liquid discharged from the gas-liquid contact tower into the gas-liquid contact tower.

8. The system of claim 1, wherein the first absorbing liquid component washing apparatus comprises a temperature controller configured to control temperature of the washing liquid.

9. The system of claim 1, wherein the first absorbing liquid component washing apparatus comprises a measuring instrument configured to measure a concentration of the product dissolved in the washing liquid or a quantity that fluctuates according to the concentration.

10. The system of claim 1, wherein a pipe disposed between the absorption tower condenser or the regeneration tower condenser and the first absorbing liquid component washing apparatus comprises a descending pipe portion or an ascending pipe portion at least in a vicinity of the first absorbing liquid component washing apparatus, the absorption tower condenser, or the regeneration tower condenser.

11. The system of claim 1, wherein the first absorbing liquid component washing apparatus is located downstream of a second absorbing liquid component washing apparatus configured to wash and remove the absorbing liquid component, and is disposed in series with the second absorbing liquid component washing apparatus.

12. A method of operating a carbon dioxide capturing system comprising:
- an absorption tower configured to bring a gas containing carbon dioxide into contact with an absorbing liquid to discharge the absorbing liquid which has absorbed the carbon dioxide and to discharge the gas whose carbon dioxide concentration is reduced;
- an absorption tower condenser configured to condense water vapor in the gas discharged from the absorption tower;
- a regeneration tower configured to release the carbon dioxide from the absorbing liquid discharged from the absorption tower to discharge the absorbing liquid whose carbon dioxide concentration is reduced and to discharge a gas containing the carbon dioxide; and
- a regeneration tower condenser configured to condense water vapor in the gas discharged from the regeneration tower, the method comprising:

cooling the gas which has passed through the absorption tower condenser or the regeneration tower condenser to condense or sublime the absorbing liquid component in the gas; and removing a liquid or solid product generated by the condensation or the sublimation of the absorbing liquid component by using a washing liquid.

* * * * *